(12) United States Patent
Salter et al.

(10) Patent No.: US 12,235,107 B2
(45) Date of Patent: Feb. 25, 2025

(54) SYSTEMS AND METHODS FOR USE OF A VEHICLE TO CONDUCT A SITE SURVEY OPERATION

(71) Applicant: Ford Global Technologies, LLC, Dearborn, MI (US)

(72) Inventors: Stuart Salter, White Lake, MI (US); Ryan Edwin Hanson, Livonia, MI (US); Hussein Berry, Dearborn, MI (US); John Van Wiemeersch, Novi, MI (US); Vivekanandh Elangovan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 385 days.

(21) Appl. No.: 17/804,485

(22) Filed: May 27, 2022

(65) Prior Publication Data

US 2023/0384096 A1 Nov. 30, 2023

(51) Int. Cl.
| | |
|---|---|
| *G01C 15/04* | (2006.01) |
| *B25J 5/00* | (2006.01) |
| *B60W 60/00* | (2020.01) |
| *G01S 13/88* | (2006.01) |
| *G06K 7/14* | (2006.01) |

(52) U.S. Cl.
CPC ......... *G01C 15/04* (2013.01); *B60W 60/0025* (2020.02); *G01S 13/885* (2013.01); *G06K 7/1413* (2013.01); *B25J 5/00* (2013.01)

(58) Field of Classification Search
None
See application file for complete search history.

(56) References Cited

U.S. PATENT DOCUMENTS

| | | | |
|---|---|---|---|
| 9,704,292 B2 | 7/2017 | Priest et al. | |
| 11,449,052 B1* | 9/2022 | Kaufman | G05D 1/0055 |
| 2007/0260378 A1* | 11/2007 | Clodfelter | F41H 11/28 |
| | | | 901/1 |

(Continued)

OTHER PUBLICATIONS

Aravinda S. Rao et al., Real-Time Monitoring of Construction Sites: Sensors, Methods, and Applications, Automotion in Construction, Apr. 2022, 1-30.

(Continued)

*Primary Examiner* — Yonel Beaulieu
*Assistant Examiner* — Laura E Linhardt
(74) *Attorney, Agent, or Firm* — Frank Lollo; Eversheds Sutherland (US) LLP

(57) ABSTRACT

The disclosure generally pertains to systems and methods for use of a vehicle to conduct a site survey. An example method can include receiving navigation guidance to move a vehicle along a pre-defined path on a property for executing a site survey operation of the property. The site survey operation can include a staking procedure performed by a robotic arm attached to the vehicle, an image capture procedure performed by use of a camera in the vehicle, and/or a subterranean scanning procedure for detecting a buried object. In an example implementation, the staking procedure can include inserting at a first location on the property, a stake having affixed thereon, a barcode label. A barcode scanner can be used to read the barcode label for obtaining information associated with an object present at the first location.

17 Claims, 5 Drawing Sheets

(56) References Cited

U.S. PATENT DOCUMENTS

| | | | |
|---|---|---|---|
| 2011/0043515 A1* | 2/2011 | Stathis | G05D 1/027 |
| | | | 434/118 |
| 2019/0383933 A1* | 12/2019 | Oehme | G01S 13/38 |
| 2021/0189747 A1 | 6/2021 | Pearson, Jr. | |
| 2021/0312100 A1 | 10/2021 | Hesnor | |
| 2021/0372768 A1 | 12/2021 | Muller et al. | |

OTHER PUBLICATIONS

B. Stanley et al., Automation of Armored Four Wheel Counter Steer Vehicles, Lincoln Laboratory Journal, vol. 22, No. 2, 2017, 115-134.

\* cited by examiner

SYSTEMS AND METHODS FOR USE OF A VEHICLE TO CONDUCT A SITE SURVEY OPERATION

BACKGROUND

Site surveys may be performed for a variety of reasons, such as identifying a boundary of a property. A typical procedure for conducting a site survey involves a technician walking around a property and performing actions, such as identifying certain objects, placing marks upon certain objects, and taking down notes. The technician may then submit information to a draftsman for obtaining documentation pertaining to the property, such as, for example, a site map or a blueprint. Such a typical procedure involves costs in terms of labor and time.

DESCRIPTION OF THE FIGURES

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
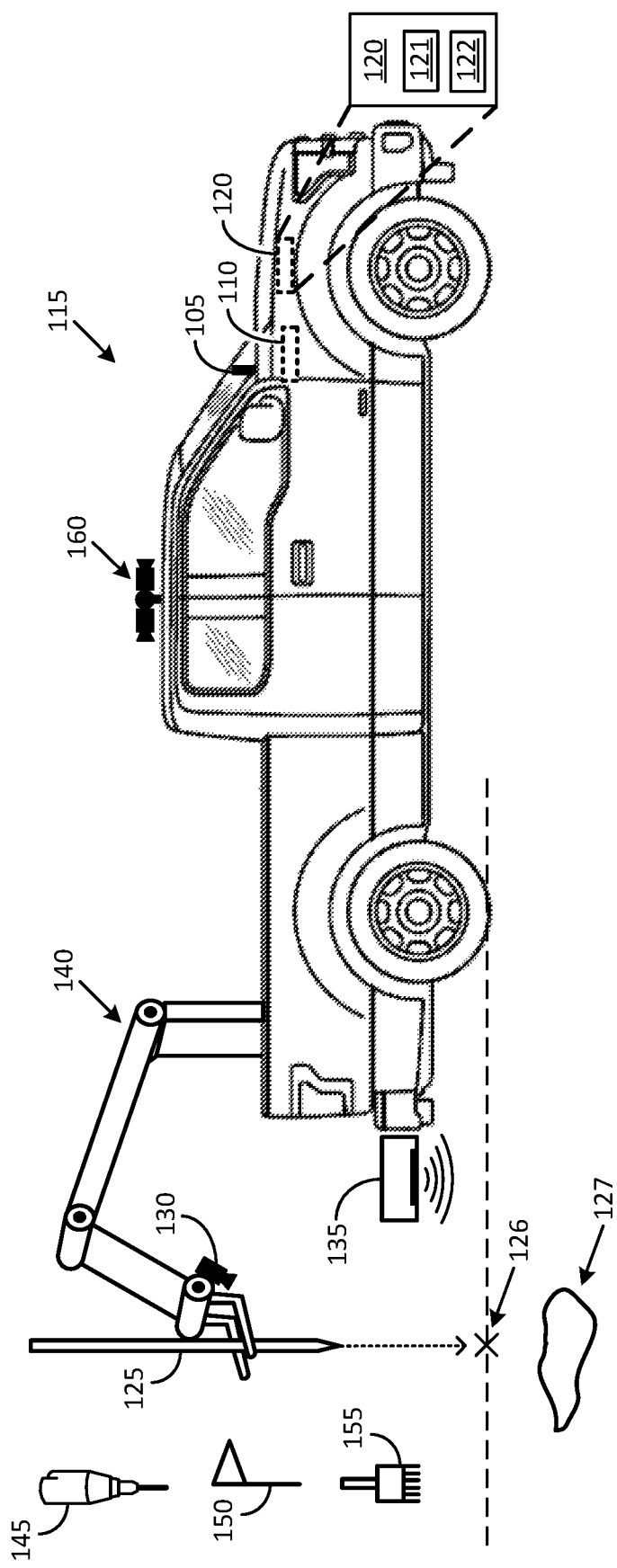
FIG. 1 illustrates an example vehicle configured for conducting a site survey in accordance with an embodiment of the disclosure.

The disclosure generally pertains to systems and methods for use of a vehicle to conduct a site survey. An example method can include receiving navigation guidance to move a vehicle along a pre-defined path on a property for executing a site survey operation of the property. The site survey operation can include a staking procedure performed by a robotic arm attached to the vehicle, an image capture procedure performed by use of a camera in the vehicle, and/or a subterranean scanning procedure for detecting a buried object. In an example implementation, the staking procedure can include inserting at a first location on the property, a stake having affixed thereon, a barcode label. A barcode scanner can be used to read the barcode label for obtaining information associated with an object present at the first location. Another example method can include moving a vehicle along a pre-defined path on a first property and executing a staking procedure performed by a robotic arm attached to the vehicle, an image capture procedure performed by use of a camera in the vehicle, and/or a subterranean scanning procedure for detecting a buried object. The method can further include generating a site survey report based on executing the staking procedure, the image capture procedure, and/or the subterranean scanning procedure.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionalities described with respect to a particular device or component may be performed by another device or component. For example, some or all of the functionalities described herein with respect to a personal device may, in certain embodiments, be performed by a vehicle controller and/or another component of a vehicle. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, the word "vehicle" as used in this disclosure can pertain to any one of various types of vehicles, such as, for example, cars, vans, sports utility vehicles, all-terrain vehicles, trucks, electric vehicles, gasoline vehicles, hybrid vehicles, and autonomous vehicles. The phrase "personal device" as used herein refers to any of various types of devices that can be carried around by an individual. A few examples of personal devices, which can also be referred to as mobile devices, can include: a cellular phone, a smartphone, a tablet computer, a phablet (phone plus tablet computer), a smart keyfob with or without a display, and a portable computer. Such personal devices may be used for performing various operations, including for communicating and/or controlling a vehicle that is conducting a site survey operation in accordance with the disclosure. A personal device may communicate with components of a vehicle, such as, for example a vehicle controller, using various communication media and communication formats. For example, a smartphone may communicate with a vehicle controller via a cellular communication link and cellular communications infrastructure (cell towers, repeaters, etc.). As another example, a phablet or a laptop computer may communicate with a vehicle controller via a Bluetooth® communication link.

The phrase "site survey" as used herein refers to any of various kinds of operations associated with surveying a green site, a brown site, and/or a site containing a building. The phrase also encompasses various types of surveying procedures that are referred to in general practice by labels such as, for example, a mortgage survey, a title survey, a boundary survey, a construction survey, a location survey, a site planning survey, a subdivision survey, and a topographic survey. In general, a site survey in accordance with the disclosure can be carried out upon any piece of land on which a vehicle can be driven.

It must be understood that words such as "implementation," "application," "scenario," "case," and "situation" as used herein represent abbreviated versions of the phrase "In an example ("implementation," "application," "scenario," "case," "approach," and "situation") in accordance with the disclosure." It must also be understood that the word "example" as used herein is intended to be non-exclusionary and non-limiting in nature.

FIG. 1 illustrates an example vehicle 115 configured for conducting a site survey in accordance with an embodiment of the disclosure. The vehicle 115 is illustrated in the form of a truck, but it must be understood that the description provided herein is equally applicable to many other vehicles such as, for example, a tractor (with or without a trailer attached), a sports utility vehicle (SUV), a utility terrain vehicle (UTV), an all-terrain vehicle (ATV), a golf cart, a riding lawn mower, and/or a construction vehicle (a bulldozer, a backhoe, a tiller, etc.). It must also be understood that description related to a cargo bed of the vehicle 115 is equally applicable to a trailer that may be hitched to any of various vehicles.

The vehicle 115 may have various types of automotive drive systems in various applications. Example drive systems can include various types of internal combustion engine (ICE) powertrains having a gasoline, diesel, or natural gas-powered combustion engine with conventional drive components such as, a transmission, a drive shaft, a differential, etc.

In some cases, the vehicle 115 may be configured as an electric vehicle (EV). More particularly, the vehicle 115 may include a battery EV (BEV) drive system. The vehicle 115 may be configured as a hybrid EV (HEV) having an independent onboard power plant or a plug-in HEV (PHEV) that includes a HEV powertrain connectable to an external power source (including a parallel or series hybrid powertrain having a combustion engine power plant and one or more EV drive systems). HEVs can include battery and/or super capacitor banks for power storage, flywheel power storage systems, or other power generation and storage infrastructure.

The vehicle 115 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components. Further, in some cases, the vehicle 115 may be a driver-operated vehicle that can be operated in a fully autonomous or partially autonomous mode. More particularly, in an example embodiment in accordance with disclosure, the vehicle 115 is an autonomous vehicle that can perform various tasks described herein in an autonomous (or semi-autonomous) mode of operation with or without a person being present in the vehicle 115.

The vehicle 115 can include various components such as, for example, a vehicle controller 110, a computer 120, an infotainment system 105, a camera 160, a robotic arm 140, and a ground penetrating radar 135. The vehicle controller 110 may be installed in an engine compartment of the vehicle 115 (as schematically illustrated in FIG. 1) or elsewhere in the vehicle 115. The vehicle controller 110 is arranged to cooperate with various components of the vehicle 115 such as, for example, a fuel injection system and a speed control system, to control various operations of the vehicle 115. Some example functions may include controlling engine operations (fuel injection, speed control, emissions control, braking, etc.), managing climate controls (air conditioning, heating etc.), activating airbags, and issuing warnings (check engine light, bulb failure, low tire pressure, vehicle in blind spot, etc.). The infotainment system 105 can include a global positioning system (GPS) navigation system and a display screen that may be used for various purposes including for purposes of displaying navigation guidance to a driver of the vehicle 115.

The computer 120 can include a processor 121 and a memory 122. The memory 122 may be a non-transitory computer-readable memory that stores computer-executable instructions. The computer-executable instructions can be provided in the form of a software application that is executed by the processor 121 to perform at least some operations associated with a site surveying system provided in the vehicle 115 in accordance with the disclosure. The site surveying system can further include the robotic arm 140, the ground penetrating radar 135, and one or more imaging devices (such as, for example, a camera 130 mounted upon the robotic arm 140 and/or the camera 160).

The robotic arm 140 can be mounted upon a cargo bed of the vehicle 115 (as schematically illustrated in FIG. 1 where the vehicle 115 is a truck) or elsewhere upon the vehicle 115. More particularly, the robotic arm 140, which is controlled by the computer 120 (and/or the vehicle controller 110) is generally configured to allow for placement of various types of objects on a ground surface on which the vehicle 115 is stopped. In the illustrated example, the robotic arm 140 includes a set of articulated arm members that allow an end portion to extend outwards from the vehicle 115. In other embodiments, the robotic arm 140 can have any of various other shapes and can include any of various other gripping mechanisms in lieu of the pair of claws shown in FIG. 1.

The commands provided by the computer 120 to the robotic arm 140 can orient the pair of claws in various directions and can move the robotic arm to any of several desired positions with respect to the chassis of the vehicle 115. For example, the computer 120 can provide commands that cause the robotic arm 140 to go through a sequence of actions for inserting a stake 125 into the ground at a precise location. Accordingly, the vehicle 115 can be stopped at a first spot on a site and the robotic arm 140 operated to insert the stake 125 into the ground at a second spot 126 that is determined by the computer 120. In an example implementation, the first spot and the second spot 126 can be defined and identified on the basis of GPS coordinates provided to the computer 120 by the GPS system of the infotainment system 105. A separation distance between the second spot 126 and a chassis portion of the vehicle 115 can be determined by the computer 120 based on known parameters of the robotic arm 140 (dimensions of articulated arm members, reach, mounting information upon cargo bed, etc.) and movements executed by the robotic arm 140 (outward extension and angle of articulated arm member, orientation etc.).

The robotic arm 140 can also be used for various other tasks such as, for example, for moving or removing objects that may be present on the grounds of the site, and/or for operating a drill 145 to drill a hole in the ground at the second spot 126. The hole may be used for example, to insert the stake 125 or to plant the flag 150. The robotic arm 140 can also be used to grip an aerosol sprayer 155 and apply a paint mark at a desired spot on the ground.

In an example implementation, items such as the stake 125, the drill 145, the flag 150, the aerosol sprayer 155, and cans of paint (not shown) can be transported in the cargo bed of the vehicle 115 and accessed by the robotic arm 140 under control of the computer 120. The paint container can be a part of a paint dispensing system that can include various types of objects such as, for example, a paint stirrer and a paint color selector. In an example embodiment, the aerosol sprayer 155 is an integral part of the robotic arm 140. In another example embodiment, the aerosol sprayer 155 is a can of spray paint. The can of spray paint may be one of several cans of spray paint stored in the cargo bed of the vehicle 115. The various cans may contain paint of various colors (orange, red, yellow, etc.) and types of paint (plain, fluorescent, etc.) that can be selectively accessed and used by the robotic arm 140 under control of the computer 120.

In an example operation, the computer 120 provides navigation guidance to a driver of the vehicle 115 (or cooperates with the vehicle controller 110 when the vehicle 115 is an autonomous vehicle) for driving and stopping at the first spot that is described above. The computer 120 may then determine that the vehicle 115 has reached the first spot and is in a parked condition at the first spot. In an example implementation, the computer 120 determines that the vehicle 115 has reached the first spot based on communications with the vehicle controller 110 and/or the GPS system. In another example implementation, the computer 120 determines that the vehicle 115 has reached the first spot based on evaluating images provided to the computer 120 by the camera 160 and/or other cameras (not shown).

The computer 120 then provides commands that cause the robotic arm 140 to pick up an item (the stake 125, for example) from the cargo bed, move the articulated arm members to position the stake 125 above the ground at the second spot 126, and to insert the stake 125 into the ground at the second spot 126. In an example implementation, the computer 120 identifies the second spot 126 based on information provided to the computer 120 by the GPS system and/or based on evaluating images provided to the computer 120 by a camera 130 mounted upon the robotic arm 140 (close to the pair of claws, for example).

In an example scenario, the second spot 126 may be associated with an object of interest for a site survey. For example, the second spot 126 may correspond to a spot at which a buried object 127 is present (a junction box or a rock, for example). The stake 125 when placed at the second spot 126 provides an indication of the buried object 127 and may serve as a visual warning for a subsequent digging operation carried out on the site. An indication of the buried object 127 may also be provided in the form of a flag or a paint mark. For example, the computer 120 may send a command to the robotic arm 140 to plant the flag 150 at the second spot 126 as a part of a flag planting procedure and/or to use the aerosol sprayer 155 to apply paint (in the form of an "x" mark, for example) on the second spot 126 where the buried object 127 is located.

In an example implementation, the buried object 127 may be located by operating the ground penetrating radar 135 mounted on the vehicle 115. The ground penetrating radar 135 may be mounted upon any of various parts of the vehicle 115 (underbody, bumper, chassis, etc.). In the illustrated example, the ground penetrating radar 135 is mounted upon a tailgate of the vehicle 115 and is operated under control of the computer 120.

In an example operating procedure, the computer 120 operates a servomotor (not shown) that causes the tailgate to transition from a vertical position (default position) to a horizontal position, whereby the ground penetrating radar 135 is oriented to perform a scanning operation to locate any objects buried under the ground. The vehicle 115 may then travel back and forth (either driver-operated or autonomously) on a site as part of a subterranean scanning procedure for detecting various kinds of buried objects such as, for example, buried cable, buried wires, buried pipes, buried debris, subterranean rocks, subterranean sink holes, and subterranean boulders, metal objects, and concrete objects.

Upon detecting an object, such as, for example, the buried object 127, the ground penetrating radar 135 provides information about the object to the computer 120. The information can include, for example, a size of the object 127, a material composition of the object 127 (metal, stone, etc.), and/or a depth of burial of the object 127. The computer 120 may then make a determination as to how to provide an indication of a characteristic of the buried object. In one example scenario, the computer 120 may select a stake of a specific color (or a flag of a specific color) for insertion at the second spot 126. In another example scenario, the computer 120 may select a ribbon or a tape of a specific color to attach to a stake that is inserted at the second spot 126. In yet another example scenario, the computer 120 may select a flag of a specific color to insert into the ground at the second spot 126, or a paint of a specific color for applying a paint mark upon the second spot 126.

Colors are often used in general practice to provide various types of information. For example, green tape is typically used to indicate sewer and drain lines; red tape is typically used to indicate electrical power lines, cables, and conduits; yellow tape is typically used to indicate gas, oil, steam, petroleum, or gaseous materials; and white tape is typically used to indicate proposed excavation routes.

Figure 2:
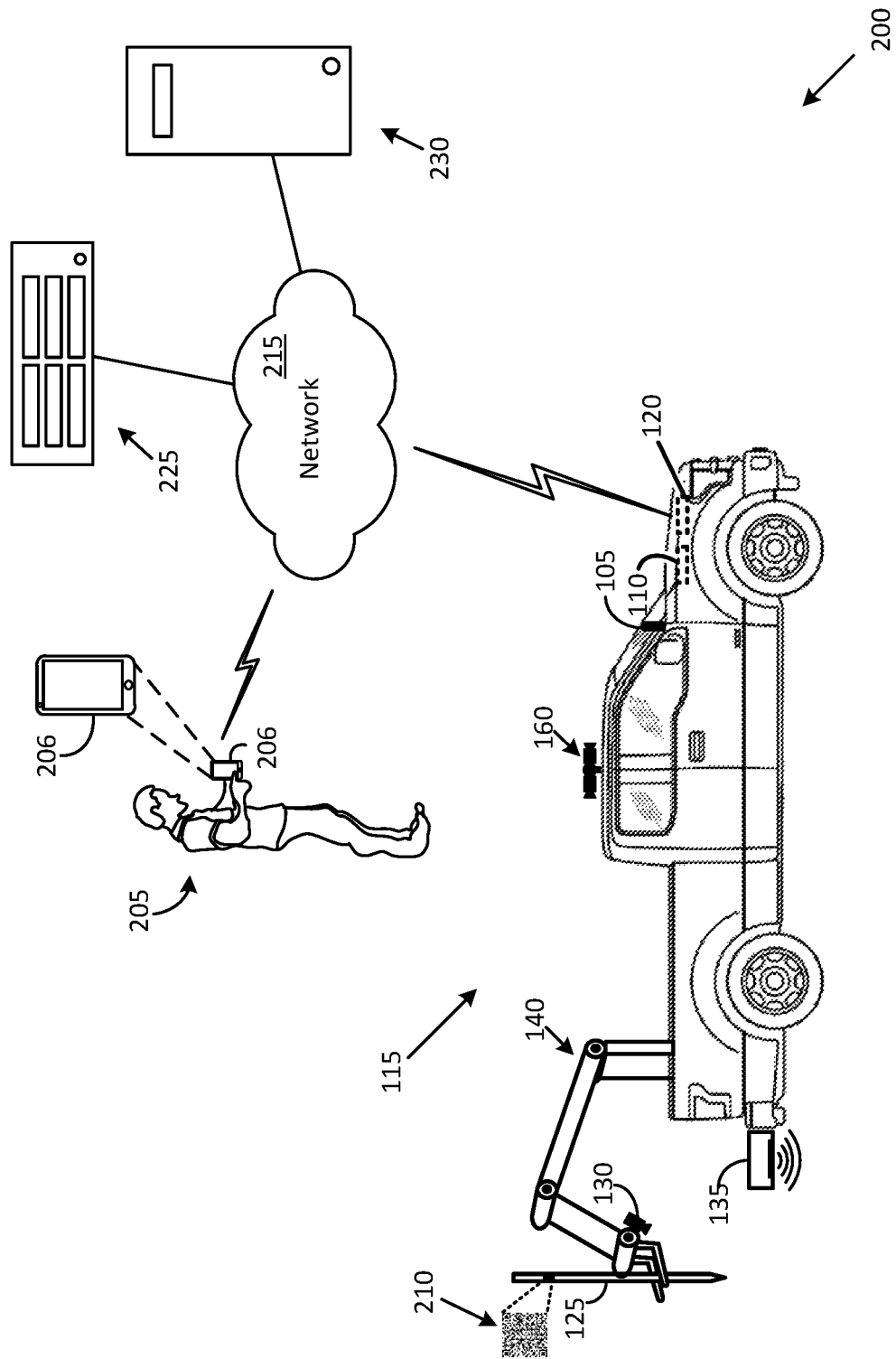
FIG. 2 illustrates an example site surveying system in accordance with an embodiment of the disclosure.

FIG. 2 illustrates an example site surveying system 200 in accordance with an embodiment of the disclosure. The example site surveying system 200 includes the vehicle 115 and can include system components such as, for example, a computer 230, a cloud storage element 225, and a personal device 206. The computer 230 can be any of various types of computers such as, for example, a server computer or a cloud computer. The cloud storage element 225 can be any of various types of bulk storage devices or distributed storage devices. The personal device 206 may be carried by an individual 205, who can be, for example, a driver of the vehicle 115.

The computer 120 and the various system components can be communicatively coupled with each other via a network 215. The network 215 may include any one, or a combination of networks, such as a local area network (LAN), a wide area network (WAN), a telephone network, a cellular network, a cable network, a wireless network, and/or private/public networks such as the Internet. At least one portion of the network 215 includes a wireless communication link (a WiFi link or a cellular link, for example), that allows the computer 120 in the vehicle 115, the vehicle controller 110, and/or the infotainment system 105 to communicate with the computer 230, the cloud storage element 225, and the personal device 206.

In an example implementation in accordance with the disclosure, a barcode label 210 is affixed to the stake 125. The barcode can be any of various types such as, for example, a Universal Product code (UPC), an International Article Number (IAN) code, a PDF417 code, a Data Matrix code, or a Quick Response (QR) code. After a staking procedure is executed by use of the vehicle 115, an individual can use a barcode scanner to scan the barcode label 210 and obtain various types of information associated with an object that is identified by the stake 125 in accordance with disclosure.

The information can be provided by any of various sources such as, for example, by a driver of the vehicle 115, and can be stored in any of various devices such as, for example, the computer 120, the cloud storage element 225 and/or the computer 230. The individual using the barcode scanner can be, for example, a technician, a landlord, an official associated with a lending institution, or a construction worker. In an example scenario, the personal device 206 may be used to scan the barcode label 210 and obtain the stored information. Access to the stored information may be password protected in some cases and may require entering of a password into a barcode scanner (such as the personal device 206) for obtaining access to the information.

In an example implementation in accordance with the disclosure, the vehicle 115 is an autonomous vehicle and the individual 205 may use the personal device 206 to control various operations of the vehicle 115 via communications with the vehicle controller 110. The individual 205 may further use the personal device 206 to communicate with the computer 120 in the vehicle 115 and to control operations of the various components of the site surveying system provided in the vehicle 115.

For example, the individual 205 may use the personal device 206 to maneuver the vehicle 115 to scan the site for buried objects and to stop the vehicle 115 at a spot that is suitable for operating the ground penetrating radar 135 and/or for operating the robotic arm 140 in accordance with the disclosure. The personal device 206 may employ any of various wireless communication technologies, such as Bluetooth®, Ultra-Wideband (UWB), Wi-Fi, Zigbee®, ultrasonic communications or near-field-communications (NFC) to communicate with the vehicle controller 110 and/or the computer 120.

In one example application, the personal device 206 contains a software application that is launched by the individual 205 by use of a human machine interface (HMI) such as, for example, a touch screen of the personal device 206. The individual 205 then issues remote-control commands by using his/her fingers to initiate gesture commands upon the touch screen, by moving the personal device 206 in various ways, and by orienting the personal device 206 in various directions and angles.

In some situations, the individual 205 may use the personal device 206 to issue remote-control commands while seated or standing inside the vehicle 115. In some other situations, the individual 205 may use the personal device 206 to issue remote-control commands while standing outside the vehicle 115, as illustrated in FIG. 2. The individual 205 may opt to stand outside the vehicle 115 for various reasons, such as, for example, to have an unrestricted view of the robotic arm 140 during a staking operation.

Figure 3:
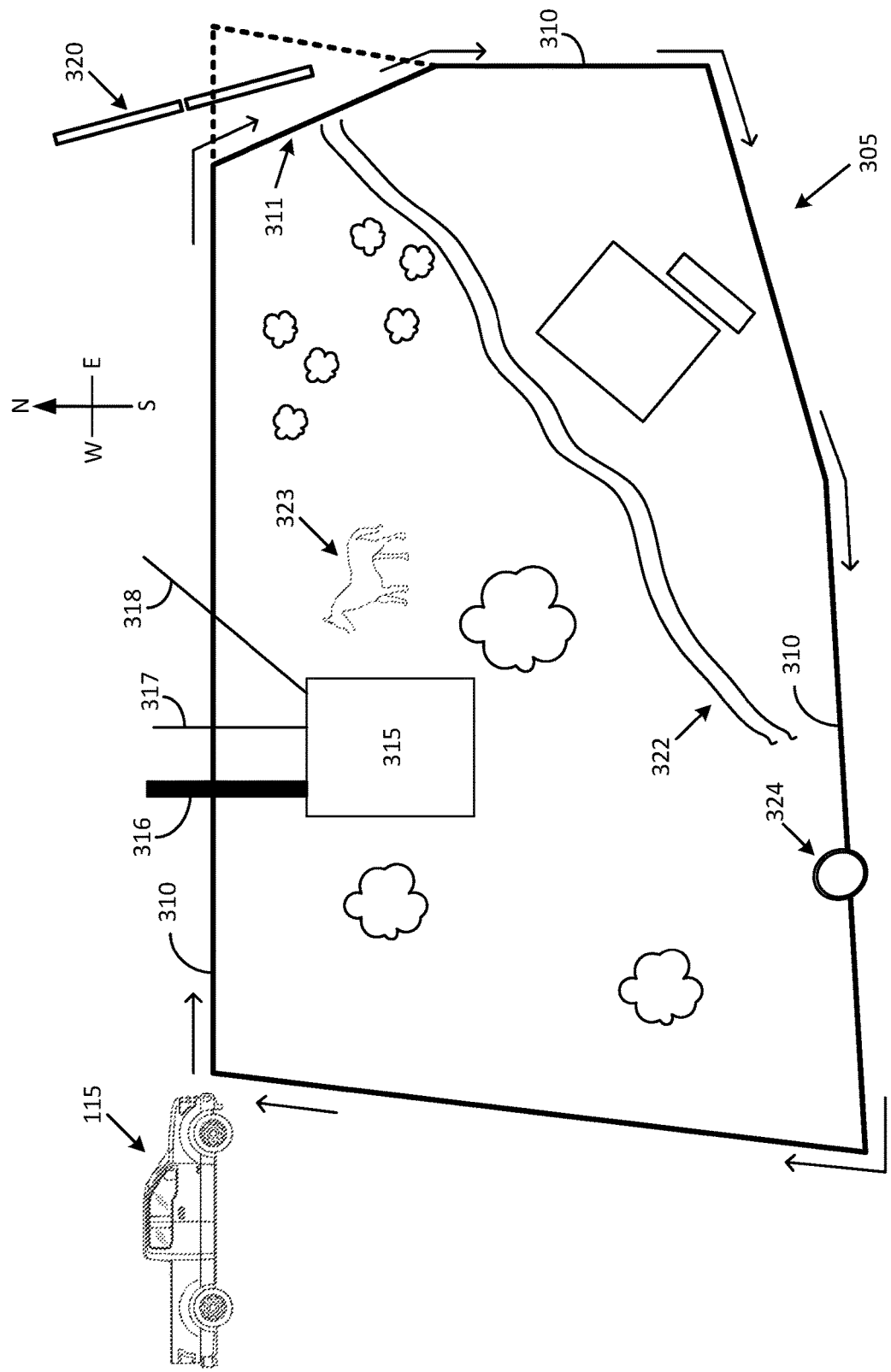
FIG. 3 illustrates an example scenario where a vehicle is used to conduct a site survey in accordance with an embodiment of the disclosure.

FIG. 3 illustrates an example scenario where the vehicle 115 is used to conduct a site survey operation of a property 305 in accordance with an embodiment of the disclosure. The site survey operation can be initiated by providing the computer 120 with a map of the property 305 and a pre-defined travel path 310 for conducting the site survey. In an example implementation, the map and the pre-defined travel path 310 may be provided to, or obtained by, the computer 120 from various entities, such as, for example, an owner of the property 305, a lending institution (bank, credit union, etc.), a builder, an architect, a government official, or a government agency. Any of these various entities may also pre-define the travel path 310. In another example scenario, the site survey operation can be carried out by moving the vehicle 115 on the property 305 without following a pre-defined travel path. Thus, for example, a driver of the vehicle 115 may move the vehicle 115 in any of various directions and on any of various areas of the property 305 based on his/her personal preference.

When the vehicle 115 is a driver-operated vehicle, the computer 120 may use the provided information to display upon a display screen of the infotainment system 105, the travel path 310 overlaid upon a graphical rendering of the property 305. The driver of the vehicle 115 may use the displayed graphical rendering and the pre-defined travel path (along with navigation assistance provided by a navigation system that can be part of the infotainment system 105) to move the vehicle 115 along the travel path 310. When the vehicle 115 is an autonomous vehicle, the computer 120 may use the provided information to cooperate with the vehicle controller 110 to autonomously move the vehicle 115 along the travel path 310.

The travel path 310 in this example roughly corresponds to a perimeter of the property 305. In other situations, a travel path may traverse the property 305, for example, in a crisscross pattern or in a pattern designed to avoid buildings and other obstacles. When driving across the property 305, the driver of the vehicle 115 (or the vehicle controller 110 when the vehicle 115 is an autonomous vehicle) drives in a manner that avoids obstacles. The obstacles can include an inanimate object (such as a building 315), an animate object (such as an animal 323), or an object of nature (such as a stream 322). In another scenario, the property 305 may include a large building that covers a significant portion of the property 305 and constitutes an object that has to be circumvented when conducting the site survey operation.

In an example procedure, the computer 120 can conduct the site survey by operating one or more cameras such as, for example, the camera 160, to acquire images of various objects that can be evaluated for navigation purposes and/or for obtaining information that may be relevant to the site survey. The images may be provided in any of various formats such as, for example, as digital images, video clips, and/or real-time video.

The computer 120 can also operate the ground penetrating radar 135 to obtain information about subterranean objects that may be present on the property 305. In the illustrated example scenario, the ground penetrating radar 135 may detect a buried water pipe 316, an electrical cable 317, and a fiber optic cable 318, each of which traverses the travel path 310 of the vehicle 115. The ground penetrating radar 135 conveys information pertaining to these objects to the computer 120. The computer 120 may then operate the robotic arm 140 to place identification elements such as, for example, the stake 125, the flag 150 or a paint mark, upon spots on the ground above the buried objects.

In an example scenario, where the stake 125 is inserted into the ground, the computer may attach to the barcode label 210, information pertaining to the buried object. An individual may scan the barcode label 210 affixed to the stake 125 that has been inserted into the ground above the buried water pipe 316, for example, and obtain information that indicates that the buried object is a water pipe having a diameter of "x" inches and buried "y" feet below the ground surface.

Further east along the travel path 310, the computer 120 may evaluate an image captured by the camera 160 and recognize that an above-ground object is present on the property 305. The above-ground object in the illustrated scenario is a fence 320 that is extending beyond a property line of a neighboring property and into the property 305. The fence 320, which may be a part of an unauthorized construction, is an undesired object on the property 305. In another scenario, a portion of a building located in the neighboring property and extending into the property 305 can constitute an undesired object.

The computer 120 may operate the robotic arm 140 to place, for example, a colored ribbon, a colored tape, and/or a barcode label upon the fence 320. When the barcode label is used, the computer 120 may generate, associate with the barcode label, and store, information pertaining to the fence 320. The computer 120 may also store an image of the fence 320.

The computer 120 may then direct the driver of the vehicle 115 to reroute the vehicle 115 via a bypass path 311 and rejoin the travel path 310 further south. Further on when traveling west on the travel path 310, the computer 120 may evaluate an image captured by the camera 160 and determine that a trash container 324 is blocking travel of the vehicle 115. The computer 120 may operate the robotic arm 140 to move the trash container 324 out of the travel path 310 so as to allow the vehicle 115 to continue moving along the travel path 310.

Figure 4:
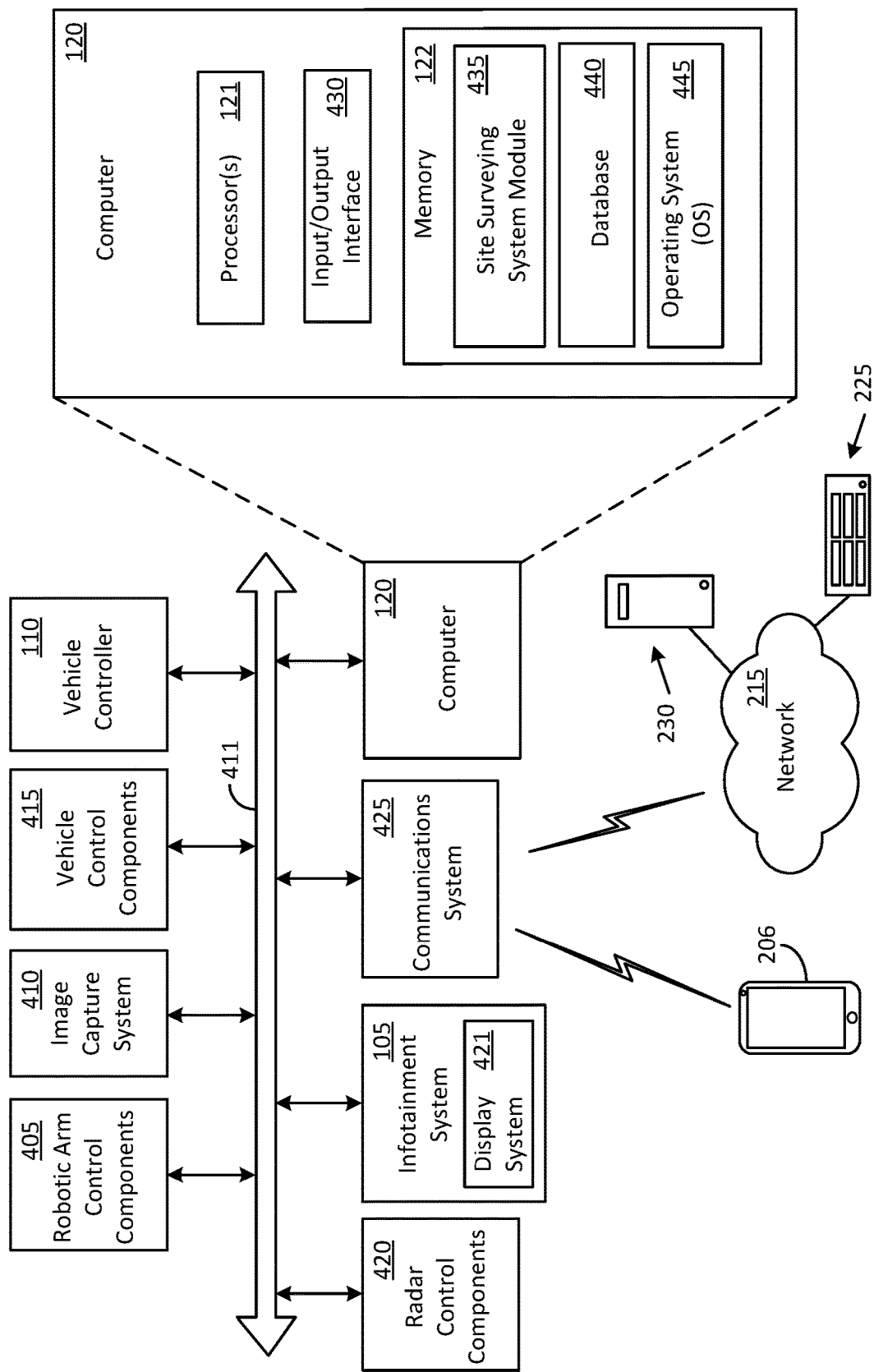
FIG. 4 illustrates some example functional components that may be included in a vehicle that is configured for executing a site surveying operation in accordance with the disclosure.

FIG. 4 shows some functional components that may be included in the vehicle 115 in accordance with an embodiment of the disclosure. The example components can include a robotic arm control system 405, an image capture system 410, a vehicle control system 415, the vehicle controller 110, a radar control system 420, the infotainment system 105, a communication system 425, and the computer 120. The various components are communicatively coupled to each other via one or more buses such as an example bus 411. The bus 411 may be implemented using various wired and/or wireless technologies. For example, the bus 411 can be a vehicle bus that uses a controller area network (CAN) bus protocol, a Media Oriented Systems Transport (MOST) bus protocol, and/or a CAN flexible data (CAN-FD) bus protocol. Some or all portions of the bus 411 may also be implemented using wireless technologies such as Bluetooth®, Ultra-Wideband, Wi-Fi, Zigbee®, or near-field-communications (NFC).

The robotic arm control system 405 can include components such as, for example, control circuitry, communication devices, servo motors, and cameras (such as, the camera 130). These components can be controlled by the processor 121 of the computer 120 for operating the robotic arm 140 in accordance with the disclosure.

The image capture system 410 can include various types of cameras such as, for example, the camera 130 that is mounted upon the robotic arm 140 and the camera 160 mounted upon the vehicle 115.

The vehicle control system 415 can include various components and systems associated with driving functions of the vehicle 115 (such as, for example, the engine, brakes, accelerator, and fuel injection) when the vehicle 115 is a driver-operated vehicle, and for automatically controlling various operations of the vehicle 115 when the vehicle 115 is an autonomous vehicle.

The radar control system 420 can include various components for controlling the ground penetrating radar 135.

The infotainment system 105 can include a display system 421 having a GUI for carrying out various operations. The GUI may be used, for example, by a driver of the vehicle 115 to interact with the computer 120 and for performing actions associated with operating the vehicle 115 for conducting a site surveying operation in accordance with the disclosure. More particularly, the computer 120 may communicate with the display system 421 for providing navigation guidance to the driver (map, travel path, etc.).

The communications system 425 can include various components such as, for example, a wireless transmitter, a wireless receiver, and/or a wireless transceiver, that are configured to allow the computer 120 and the vehicle controller 110 to communicate with devices such as, for example, the personal device 206, the computer 230, and the cloud storage element 225. The communications may be carried out via wireless signals either directly or via the network 215 by use of any of various communication formats such as, for example, WiFi, cellular, TCP/IP, Bluetooth®, Ultra-Wideband, Wi-Fi, Ultra-Wideband (UBW), Zigbee®, and near-field-communications (NFC).

In one implementation, the computer 120 can be an independent device (enclosed in an enclosure, for example). In another implementation, some or all components of the computer 120 can be housed, merged, or can share functionality, with the vehicle controller 110. For example, an integrated unit that combines the functionality of the computer 120 with that of the vehicle controller 110 can be operated by a single processor and a single memory device. In the illustrated example configuration, the computer 120 includes the processor 121, an input/output interface 430, and the memory 122.

The input/output interface 430 is configured to provide communications between the computer 120 and other components such as the robotic arm control system 405, the radar control system 420, and the image capture system 410 (for receiving images from the cameras, for example).

The memory 122, which is one example of a non-transitory computer-readable medium, may be used to store an operating system (OS) 445, a database 440, and various code modules such as a site surveying system module 435. The code modules are provided in the form of computer-executable instructions that can be executed by the processor 121 for performing various operations in accordance with the disclosure.

The database 440 may be used to store information such as, for example, images captured by use of the image capture system 410, information associated with barcode labels, and information obtained from the computer 230 and/or cloud storage element 225.

Figure 5:
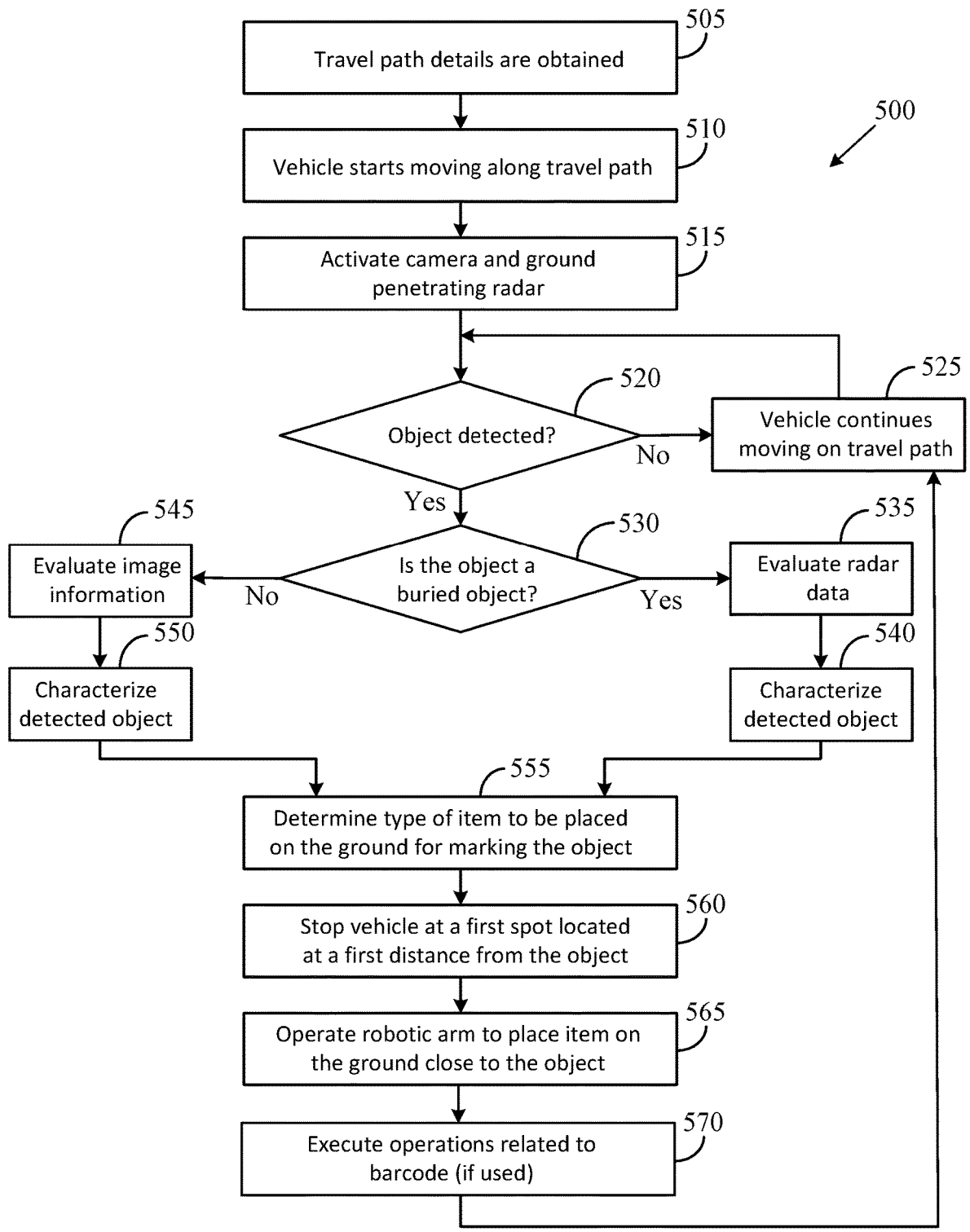
FIG. 5 shows a flowchart of an example method for a vehicle to conduct a site survey in accordance with an embodiment of the disclosure.

FIG. 5 shows a flowchart 500 of an example method in accordance with the disclosure for the vehicle 115 to conduct a site surveying operation. The flowchart 500 illustrates a sequence of operations that can be implemented in hardware, software, or a combination thereof. In the context of software, the operations represent computer-executable instructions stored on one or more non-transitory computer-readable media, such as, for example, the memory 122 of the computer 120, a memory contained in the personal device 206, and/or a memory contained in the vehicle controller 110, that, when executed by one or more processors, such as the processor 121 of the computer 120, a processor in the personal device 206, or a processor in the vehicle controller 110 respectively, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. Various operations described in the flowchart 500 may be executed by the computer 120, the vehicle controller 110, the personal device 206, the computer 230, and/or a driver of the vehicle 115. The description below may make reference to certain components and objects shown in other figures (the computer 120, the vehicle controller 110, the personal device 206, and the computer 230, for example) but it should be understood that this is done for purposes of explaining certain aspects of the disclosure and that the description is equally applicable to various other components in various embodiments.

At block 505, travel path details for performing a site surveying operation are obtained by the computer 120. The travel path details can include, for example, details pertaining to the site to be surveyed (map, boundaries, type of objects present on the site, etc.) and can further include objectives of the surveying operation. In one example scenario, the vehicle 115 is an autonomous vehicle and the operations described below can be performed by the computer 120 either independently or in cooperation with the vehicle controller 110. In another example scenario, the vehicle 115 is a driver-operated vehicle and at least some of the operations described below may be performed by the driver based on guidance provided by the computer 120.

The travel path details may be presented to the driver in the form of a map displayed on a display of the infotainment system 105. Navigation guidance may be provided in the form of visual guidance (travel path overlaid on map, for example) or audible instructions (provided via a speaker of the infotainment system 105, for example).

At block 510, the vehicle 115 starts moving along the travel path (either autonomously or under control of the driver). An example scenario that may be applicable to block 510 and subsequent blocks is illustrated in FIG. 3 and described above.

At block 515 one or more cameras (such as, for example, the camera 160 mounted upon the vehicle 115) and the ground penetrating radar 135 are activated.

At block 520, a determination is made whether an object has been detected based on evaluating the captured images and/or based on evaluating radar data.

If no object has been detected, at block 525, the vehicle 115 continues moving on the travel path and the operations indicated in block 520 and subsequent blocks are carried out.

If, at block 520, an object is detected, at block 530, a determination is made whether the object is a buried object.

If the object is a buried object, at block 535, data obtained from the ground penetrating radar 135 is evaluated by the computer 120.

At block 540, the detected object is characterized based on evaluating the radar data. The characterization can include, for example, determining a depth at which the object is buried below the ground surface, determining an identity of the object (cable, water pipe, sewage pipe, fiber optic cable, etc.), and determining various dimensions of the buried object. In the case of a buried water pipe, for example, the characterization may indicate that the water pipe has a diameter of "x" inches and is buried "y" feet below the ground surface. Information about the buried object may be stored in the memory 122 of the computer 120 and/or may be conveyed by the computer 120 to the computer 230 and/or the cloud storage element 225 for storage and access by various entities. Operations then continue at block 555 that is described below.

If, at block 530, it is determined that the object is not a buried object, at block 545, an image of the object that is obtained from a camera 160 is evaluated by the computer 120. In some cases, multiple images (in the form of a video clip or real-time video, for example) may be evaluated. The images can be stored in the memory 122 of the computer 120 and/or may be conveyed by the computer 120 to the computer 230 and/or the cloud storage element 225 for storage and access by various entities. Information and annotation associated with the images can also be stored in the memory 122, the computer 230, and/or the cloud storage element 225.

At block 550, the detected object is characterized based on evaluating the image(s). The characterization can include, for example, determining an identity of the object (tree, building structure, mailbox, boulder, fence, etc.), determining various dimensions of the object (shape, width, height, etc.), and determining whether the object is an undesirable object (fence protruding from neighboring property, for example). Information about the object may be stored in the memory 122 of the computer 120 and/or may be conveyed by the computer 120 to the computer 230 and/or the cloud storage element 225 for storage and access by various entities.

At block 555, a determination is made about a type of item to be placed on the ground for marking the object. In an example implementation, the determination may be made by executing an artificial intelligence (AI) procedure and/or a machine learning procedure. The item can be, for example, the stake 125 or the flag 150 shown in FIG. 1 and items such as a ribbon, a tape, and/or a paint mark. The determination may be made on the basis of the characteristic of the object (pipe, wire, fence, rock, etc.). In the case of a buried object, for example, it may be desirable to insert the stake 125 into the ground and attach a tape of a specific color to the stake 125. For example, a green tape may be used to indicate a sewer line, a red tape to indicate an electrical power line or a cable, and a yellow tape to indicate a pipe carrying gas, oil, steam, petroleum, or gaseous materials.

As another example, the determination made in block 555 can be a paint mark (such as for example, an orange "x" mark or an orange line) that can be applied by use of the aerosol sprayer 155.

At block 560, the vehicle 115 is stopped at a first spot located at a first distance from the detected object. The location of the first spot can be determined by the computer 120 based on various factors such as, for example, based on the type of item to be placed on the ground, based on the terrain, and/or based on the robotic arm 140. For example, it is preferable to park the vehicle 115 upon a flat, dry, firm area rather than on a slope so as to maximize stability of the vehicle 115 (particularly, when the robotic arm 140 is in operation). It is also preferable to park the vehicle 115 based on operating characteristics of the robotic arm 140 such as, for example, a reach and a maneuverability of the robotic arm 140.

For example, it may be preferable to park the vehicle 115 "x" feet from the spot at which a buried object is located so as to allow the robotic arm 140 to operate the drill 145 to bore a hole into the ground to a desired depth and to insert the stake 125 into the hole.

At block 565, the robotic arm 140 is operated to place the selected item (stake, flag, paint mark, etc.) upon a second spot that is separated from the first spot. The second spot corresponds to a location of the object (such as, for example, directly above a buried object or in the vicinity of an above-ground object). The separation distance between the first spot and the second spot is selected to be less than, or equal, to an operational reach of the robotic arm 140.

At block 570, the computer 120 may execute some operations associated with a barcode (if the item inserted into the ground is the stake 125 having an affixed barcode). An example operation can involve the generation of an association between the barcode and information pertaining to the object. The information can include, for example, a description of a buried object, instructions on what is to be done with the object (such as, for example, "Remove object," "Move object," or "Advise neighbor to remove portion of the fence"), or a warning (such as, for example "Do not dig at this spot"). The information may also be stored in the memory 122 of the computer 120 and/or may be conveyed by the computer 120 to the computer 230 and/or the cloud storage element 225 for storage and access by various entities.

Upon completion of actions indicated in block 570, at block 525, the vehicle 115 continues moving along the travel path followed by actions indicated in subsequent blocks of the flowchart 500. The computer 120 may also automatically generate a site survey report based on the site survey operation indicated by the flowchart 500.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device, such as a memory provided in the personal device 206 can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
    receiving navigation guidance to move a vehicle along a pre-defined path on a property;
    activating a camera and a ground penetrating radar of the vehicle;
    moving the vehicle along the pre-defined path;
    detecting an object at a first location along the pre-defined path;
    determining information about the object from one of the camera or the ground penetrating radar;
    determining an item to be placed on the ground for marking the object;
    operating, by the vehicle, a robotic arm attached to the vehicle to grab the item from a cargo location of the vehicle;
    stopping the vehicle at a second location located at a first distance from the first location;
    generating a barcode encoded with the information about the object;
    attaching the barcode to the item; and
    operating the robotic arm attached to the vehicle to place the item at the second location.

2. The method of claim 1, wherein the navigation guidance is provided by a navigation system to one of a driver of the vehicle, an individual located outside the vehicle, or a computer that controls a movement of the vehicle, the method further comprising:
    automatically generating a site survey document.

3. The method of claim 1, wherein the pre-defined path corresponds to a perimeter of the property.

4. The method of claim 1, further comprising performing a paint mark application procedure using a paint marking apparatus provided in the vehicle.

5. The method of claim 1, further comprising planting a flag using the robotic arm at the first location.

6. A method comprising:
    moving a vehicle along a pre-defined path on a first property;
    executing at least one of a staking procedure performed by a robotic arm attached to the vehicle, an image capture procedure performed by use of a camera in the vehicle, or a subterranean scanning procedure for detecting a buried object; and
    generating a site survey report based on the executing at least one of the staking procedure, the image capture procedure, or the subterranean scanning procedure;
    detecting, by the vehicle as the vehicle moves along the pre-defined path and on the first property, an above-ground object located on the first property;
    obtaining information about the above-ground object;
    determining, based on the information, that the above-ground object is an undesired object; wherein the undesired object is one of an unauthorized construction or a portion of a building located in an adjacent property and extending into the first property;
    capturing a first image of the undesired object;
    including the first image in the site survey report; and
    removing or moving, by a robot arm of the vehicle, the undesired object from the pre-defined path.

7. The method of claim 6, wherein the staking procedure comprises inserting at a first location on the first property, a stake having affixed thereon, a barcode label, and wherein the method further comprises:
    using a barcode scanner to read the barcode label for obtaining information associated with the buried object.

8. The method of claim 7, wherein the information associated with the buried object is stored in one of a cloud computer or a cloud storage element and wherein obtaining the information comprises:
    entering a password into the barcode scanner for obtaining access to the information.

9. The method of claim 6, further comprising:
    detecting at a first location, via the subterranean scanning procedure, the buried object; and
    utilizing the robotic arm to plant a flag at the first location to provide a visual indication of a presence of the buried object.

10. The method of claim 6, further comprising:
    detecting at a first location, via the subterranean scanning procedure, the buried object;
    determining a distance between the buried object and a ground surface at the first location; and
    utilizing the robotic arm to insert a stake at the first location, the stake providing an indication of a presence of the buried object and a depth at which the buried object is located below the ground surface.

11. The method of claim 10, wherein the depth at which the buried object is located below the ground surface is indicated by a color of the stake and/or a depth of insertion of the stake at the first location.

12. A site surveying system comprising:
a vehicle comprising:
   a robotic arm;
   a camera;
   a ground penetrating radar; and
   a computer communicatively coupled to the robotic arm and the ground penetrating radar, the computer comprising:
      a memory that stores computer-executable instructions; and
      a processor configured to access the memory and execute the computer-executable instructions to at least:
activate the camera and the ground penetrating radar of the vehicle;
move the vehicle along a pre-defined path of a property;
detect an object at a first location along the pre-defined path;
determine information about the object from one of the camera or the ground penetrating radar;
determine an item to be placed on the ground for marking the object;
operate, by the vehicle, the robotic arm attached to the vehicle to grab the item from a cargo location of the vehicle;
stop the vehicle at a second location located at a first distance from the first location;
generate a barcode encoded with the information about the object;
attach the barcode to the item; and
operate the robotic arm to place the item at the second location.

13. The site surveying system of claim 12, further comprising:
   a navigation system that is one of provided in the vehicle or located outside the vehicle; and
   a paint dispensing system configured to dispense paint to a ground surface of the property under control of the processor.

14. The site surveying system of claim 13, wherein the vehicle is an autonomous vehicle and wherein the processor is further configured to access the memory and execute additional computer-executable instructions to:
   move the vehicle autonomously on the property based on navigation guidance received from the navigation system.

15. The site surveying system of claim 13, wherein the processor is further configured to access the memory and execute additional computer-executable instructions to:
   configure the navigation system to provide navigation guidance to a driver of the vehicle to move the vehicle along the pre-defined path.

16. The site surveying system of claim 13, wherein the processor is further configured to access the memory and execute additional computer-executable instructions to:
   apply a paint mark on the property by operating the paint dispensing system.

17. The site surveying system of claim 12, wherein the processor is further configured to access the memory and execute additional computer-executable instructions:
   provide information pertaining to the second location.

* * * * *